US012013654B2

(12) United States Patent
Kawasaki et al.

(10) Patent No.: US 12,013,654 B2
(45) Date of Patent: Jun. 18, 2024

(54) FIXING DEVICE AND IMAGE FORMING APPARATUS PROVIDED THEREWITH

(71) Applicant: KYOCERA Document Solutions Inc., Osaka (JP)

(72) Inventors: Hiroki Kawasaki, Osaka (JP); Takashi Eiki, Osaka (JP); Ryohei Tokunaga, Osaka (JP); Yuta Kitabayashi, Osaka (JP); Rina Kikugawa, Osaka (JP); Shunsaku Fujii, Osaka (JP); Tei To, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/059,741

(22) Filed: Nov. 29, 2022

(65) Prior Publication Data

US 2023/0168615 A1 Jun. 1, 2023

(30) Foreign Application Priority Data

Nov. 30, 2021 (JP) ................................ 2021-193975

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2053; G03G 2215/2003
See application file for complete search history.

(56) References Cited

U.S. PATENT DOCUMENTS 6,993,279 B2 † 1/2006 Fukuzawa
2011/0236090 A1 9/2011 Uchiyama et al. ........... 399/329
2014/0029992 A1 * 1/2014 Yamamoto ......... G03G 15/2064 399/328

FOREIGN PATENT DOCUMENTS

JP 08063021 A * 3/1996
JP 08328407 A † 12/1996
JP 2596530 B2 † 1/1997
JP 2011-227474 A 11/2011

OTHER PUBLICATIONS

JP 08063021 English machine translation, Ouchi, Mar. 8, 1996 (Year: 1996).*

* cited by examiner
† cited by third party

*Primary Examiner* — Thomas S Giampaolo, II
(74) *Attorney, Agent, or Firm* — Stein IP, LLC

(57) ABSTRACT

A fixing device includes a first fixing member, a second fixing member, a pressing member, and a heating device. The first fixing member is in an ungrounded state and comes into contact with a toner image on a sheet. The second fixing member is arranged opposite the first fixing member. The pressing member presses the first fixing member against the second fixing member so as to form, at the contact portion between the first fixing member and the second fixing member, a nip portion through which the sheet passes. The heating device heats the first fixing member.

4 Claims, 2 Drawing Sheets

FIXING DEVICE AND IMAGE FORMING APPARATUS PROVIDED THEREWITH

INCORPORATION BY REFERENCE

This application is based on and claims the benefit of priority from Japanese Patent Application No. 2021-193975 filed on Nov. 30, 2021, the contents of which are hereby incorporated by reference.

BACKGROUND

The present disclosure relates to a fixing device and an image forming apparatus provided therewith.

In image forming apparatuses, widely used for the purpose of fixing a toner image on a sheet as a recording medium (a printing sheet, an envelope, etc.) are fixing devices provided with a first fixing member such as a fixing roller or a fixing belt and a second fixing member such as a pressure roller. The first fixing member and the second fixing member are in pressure contact with each other and form a fixing nip portion. With an outer peripheral surface of the first fixing member in a state of being heated to a predetermined temperature, a sheet is passed through the fixing nip portion. At this time, the outer peripheral surface of the first fixing member comes into contact with a surface of the sheet on which a toner image has been formed. In this manner, heat and pressure are applied to the toner image formed on the sheet to fuse and fix the toner image on the sheet.

In such a fixing device, when the sheet passes through the fixing nip portion, part of toner from the toner image before being fixed may electrostatically adhere to the outer peripheral surface of the first fixing member to be then transferred onto a subsequent sheet, thereby causing image failure, namely, what is called an electrostatic offset phenomenon. Some known fixing devices are provided with a charge applying device to suppress occurrence of the electrostatic offset phenomenon.

The charge applying device charges the outer peripheral surface of the first charging member and a surface of the sheet (specifically, a part of the surface that comes into contact with the outer peripheral surface of the first fixing member, the part not having come into contact with the first fixing member yet). The charge applying device includes a plurality of electrodes, and applies a high voltage between these electrodes to cause a corona discharge to generate positive ions. The thus generated positive ions move onto the sheet and to the outer peripheral surface of the first fixing member, as a result of which the sheet and the outer peripheral surface of the first fixing member are charged to the same (positive) polarity. Thereby, it becomes less likely for the unfixed toner image on the sheet to adhere to the outer peripheral surface of the first fixing member.

SUMMARY

According to an aspect of the present disclosure, a fixing device includes a first fixing member, a second fixing member, a pressing member, and a heating device. The first fixing member is in an ungrounded state and comes into contact with a toner image on a sheet. The second fixing member is arranged opposite the first fixing member. The pressing member presses the first fixing member against the second fixing member so as to form, at a contact portion between the first fixing member and the second fixing member, a nip portion through which the sheet passes. The heating device heats the first fixing member.

DETAILED DESCRIPTION

Figure 1:
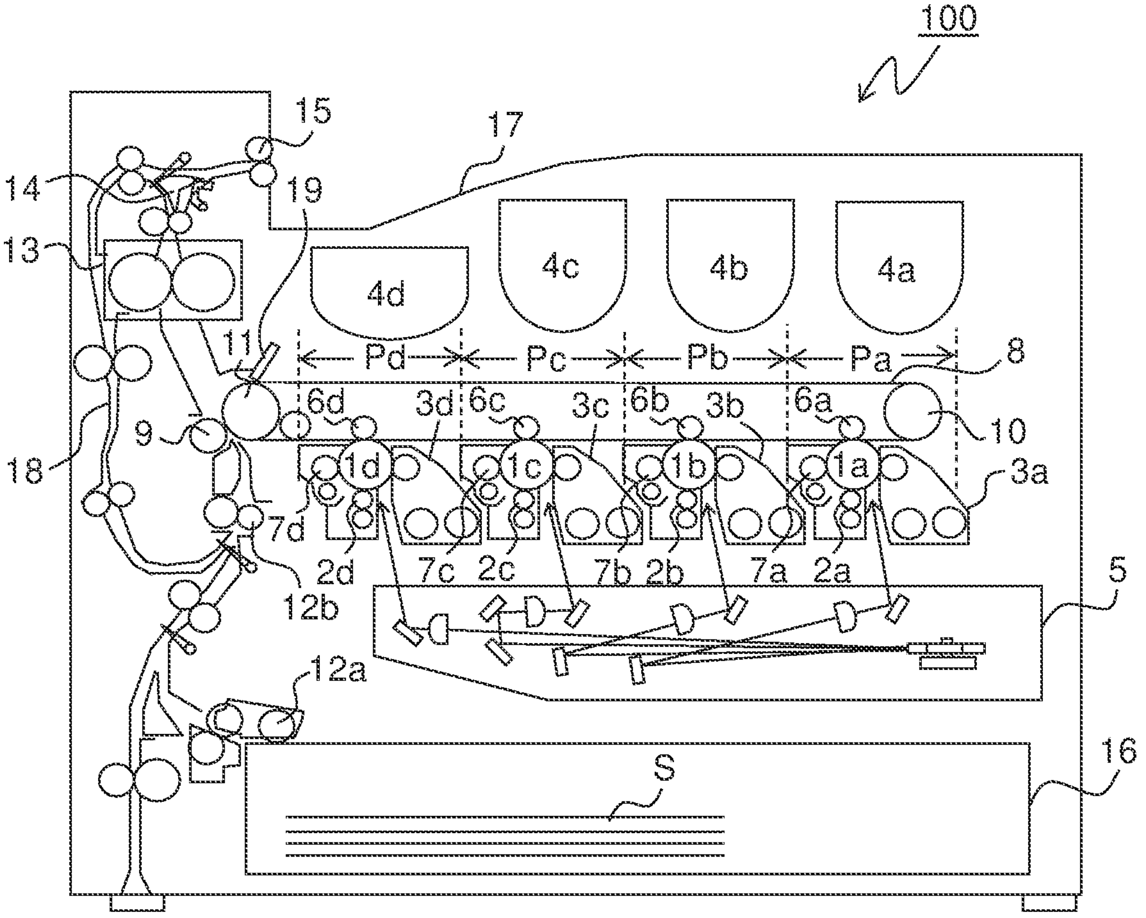
FIG. 1 is a schematic sectional view showing an internal structure of an image forming apparatus according to an embodiment of the present disclosure.

Hereinafter, embodiments of the present disclosure will be described with reference to the accompanying drawings. FIG. 1 is a schematic sectional view showing an internal structure of an image forming apparatus 100 according to an embodiment of the present disclosure. The image forming apparatus 100 (here, a color printer) includes, in a main body thereof, four image forming portions Pa, Pb, Pc, and Pd arranged in this order from an upstream side (a right side in FIG. 1) in a conveyance direction of an intermediate transfer belt 8, which will be described later. The image forming portions Pa to Pd are provided corresponding to images of four different colors (cyan, magenta, yellow, and black), and sequentially form images of these colors through charging, exposure, developing, and transfer processes.

The image forming portions Pa, Pb, Pc, and Pd are provided with photosensitive drums 1*a*, 1*b*, 1*c*, and 1*d*, respectively, which carry visible images (toner images) of respective colors. Furthermore, the intermediate transfer belt 8 is arranged adjacent to the image forming portions Pa to Pd. The intermediate transfer belt 8 rotates clockwise in FIG. 1. The intermediate transfer belt 8 moves in contact with the photosensitive drums 1*a* to 1*d*, and thereby toner images formed on the photosensitive drums 1*a* to 1*d* are primarily transferred one by one onto the intermediate transfer belt 8 and superposed one on another.

Thereafter, the toner images having been primarily transferred onto the intermediate transfer belt 8 are secondarily transferred by a secondary transfer roller 9 onto a sheet S as one example of a recording medium (a printing sheet, an envelope, an overhead projection (OHP) sheet, etc.). Further, the sheet S with the secondarily transferred toner images is subjected to fixing of the toner images at a fixing device 13, and is then discharged out of the main body of the image forming apparatus 100. An image forming process is executed with respect to the photosensitive drums 1*a* to 1*d* while rotating the photosensitive drums 1*a* to 1*d* counterclockwise in FIG. 1 by means of a main motor (unillustrated).

The sheet S is stored in a sheet cassette 16 arranged in a lower portion of the main body of the image forming apparatus 100, and is conveyed, via a sheet feeding roller 12*a* and a pair of registration rollers 12*b*, to a nip portion between the secondary transfer roller 9 and a driving roller 11 of the intermediate transfer belt 8. Used as the intermediate transfer belt 8 is a sheet of a dielectric resin, typically a belt with no seam (a seamless belt). Further, a belt cleaner 19 is arranged downstream of the secondary transfer roller 9. The belt cleaner 19 is blade-shaped, and removes toner and other substances left on a surface of the intermediate transfer belt 8.

Next, the image forming portions Pa to Pd will be described. Around and under the photosensitive drums 1*a* to 1*d*, which are arranged rotatably, there are provided charging devices 2*a*, 2*b*, 2*c*, and 2*d* that charge the photosensitive drums 1*a* to 1*d*, an exposure device 5 that exposes the photosensitive drums 1*a* to 1*d* to light conveying image information, developing device 3*a*, 3*b*, 3*c*, and 3*d* that form toner images on the photosensitive drums 1*a* to 1*d*, and cleaning devices 7*a*, 7*b*, 7*c*, and 7*d* that remove developer (toner) and other substances left on the photosensitive drums 1*a* to 1*d*.

When image data is received from a host device such as a personal computer, first, the charging devices 2*a* to 2*d* uniformly charge surfaces of the photosensitive drums 1*a* to 1*d*. Then, the exposure device 5 irradiates the photosensitive drums 1*a* to 1*d* with light according to the image data, so that electrostatic latent images are formed on the photosensitive drums 1*a* to 1*d* corresponding to the image data.

The developing devices 3*a* to 3*d* are each loaded with a predetermined amount of two-component developer including a cyan, magenta, yellow, or black toner. When, as a result of the toner-image formation, proportions of toners in the two-component developers in the developing devices 3*a* to 3*d* have fallen below a prescribed value, toners are replenished from toner containers 4*a* to 4*d* to the developing devices 3*a* to 3*d*. The toners in the developers are supplied by the developing devices 3*a* to 3*d* onto the photosensitive drums 1*a* to 1*d*, and electrostatically adhere to the photosensitive drums 1*a* to 1*d*. In this manner, toner images corresponding to the electrostatic latent images formed by exposure to light from the exposure device 5 are formed on the photosensitive drums 1*a* to 1*d*.

Then, by primary transfer rollers 6*a* to 6*d*, an electric field is applied at a predetermined transfer voltage between the primary transfer rollers 6*a*, 6*b*, 6*c*, and 6*d* and the photosensitive drums 1*a*. 1*b*, 1*c*, and 1*d*, respectively, and the toner images of the four different colors formed on the photosensitive drums 1*a* to 1*d* are primarily transferred onto the intermediate transfer belt 8. These images of the four different colors are formed with a predetermined positional relationship among them that is prescribed in advance for formation of a predetermined full-color image. Thereafter, in preparation for a subsequent formation of new electrostatic latent images, toner and other substances left on the surfaces of the photosensitive drums 1*a* to 1*d* after the primary transfer are removed by the cleaning devices 7*a* to 7*d*.

The intermediate transfer belt 8 is stretched around a driven roller 10 located on an upstream side and a driving roller 11 located on a downstream side. When, along with rotation of the driving roller 11 caused by a belt driving motor (unillustrated), the intermediate transfer belt 8 starts to rotate clockwise, a sheet S is conveyed at a predetermined timing from the pair of registration rollers 12*b* to a nip portion (a secondary transfer nip portion) between the driving roller 11 and the secondary transfer roller 9, where the full-color image on the intermediate transfer belt 8 is secondarily transferred onto the sheet S. The sheet S having the secondarily transferred toner image is conveyed to the fixing device 13.

At the fixing device 13, the sheet S is subjected to fixing by being heated and pressed by a fixing belt 21 (a first fixing member) and a pressure roller 22 (a second fixing member) to have the toner image fixed on the surface thereof (see FIG. 2), and thereby a predetermined full-color image is formed. The sheet S having the full-color image formed thereon has its conveyance direction switched by a branch portion 14 branching into a plurality of directions, so that the sheet S is discharged as it is (or after being sent into a duplex-printing conveying path 18 and subjected to duplex printing) onto a discharge tray 17 by a pair of discharge rollers 15.

Figure 2:
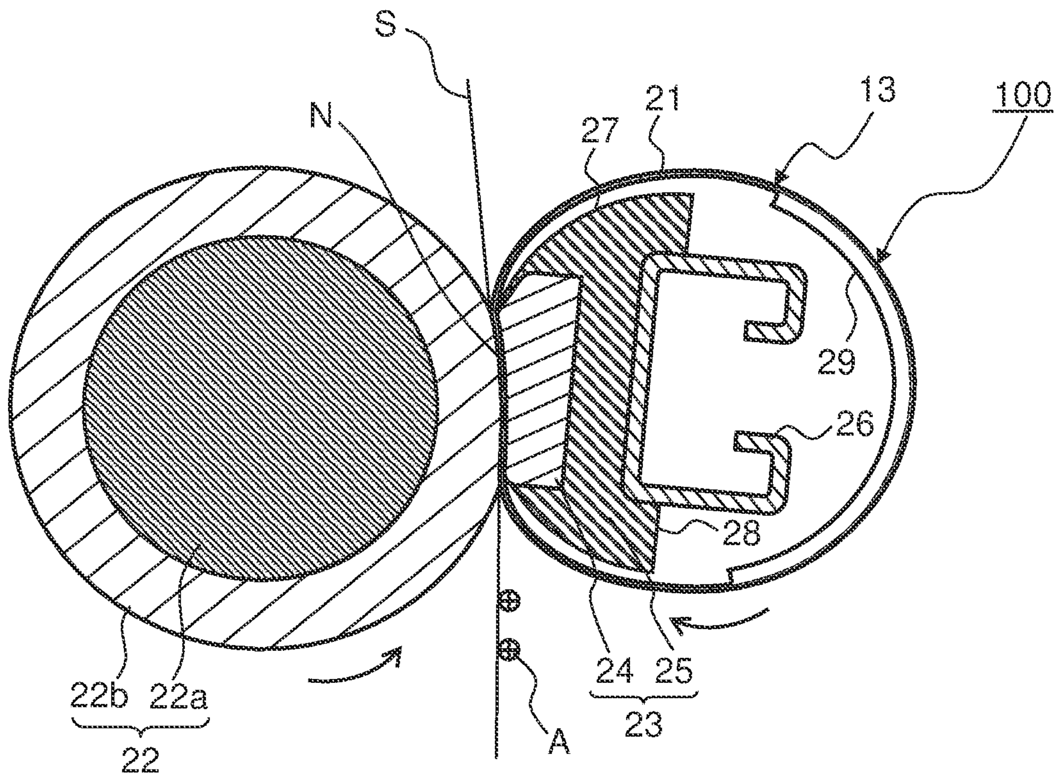
FIG. 2 is a side sectional view of a fixing device incorporated in the image forming apparatus.

FIG. 2 is a side sectional view of the fixing device 13 incorporated in the image forming apparatus 100. Note that in FIG. 2, an upper side is a downstream side in an insertion direction of a sheet with respect to the fixing device 13 (a conveyance direction of a sheet), and a lower side is an upstream side in the insertion direction of a sheet with respect to the fixing device 13. Note also that a width direction of a sheet S, which is orthogonal to the conveyance direction of the sheet S, in other words, an axial direction of the fixing belt 21 and the pressure roller 22 (the direction perpendicular to the plane of the sheet on which FIG. 2 is drawn) will be referred to simply as the axial direction. Note also that a radial direction of the fixing belt 21, which is orthogonal to the axial direction, will be referred to simply as the radial direction.

As shown in FIG. 2, the fixing device 13 includes the pressure roller 22, the fixing belt 21, a heating device 23, a pressing member 26, and a belt guide 29. The pressure roller 22 is positioned with respect to the fixing belt 21 such that their outer peripheral surfaces are opposite each other along the radial direction. The heating device 23, the pressing member 26, and the belt guide 29 are arranged inside the fixing belt 21 in the radial direction.

The pressure roller 22 is supported in a housing of the fixing device 13 so as to be rotatable about a horizontal axis. The pressure roller 22 has a cylindrical columnar shape, and a length thereof in the axial direction (a length in the width direction of the sheet S) is approximately equal to that of the fixing belt 21, which will be described later. To the pressure roller 22, a predetermined pressure toward the fixing belt 21 is applied by a pressure mechanism (unillustrated). The outer peripheral surface of the pressure roller 22 presses a heat generator 24 via the fixing belt 21 so as to be in pressure contact with the outer peripheral surface of the fixing belt 21, and thereby forms a fixing nip portion N (a nip portion). The fixing belt 21 and the heat generator 24 will be described later in detail.

The pressure roller 22 is connected to a fixing driving motor (unillustrated), and rotates counterclockwise in FIG. 2. The pressure roller 22 is in contact with the outer peripheral surface of the fixing belt 21, and applies a clockwise rotation driving force to the fixing belt 21.

The pressure roller 22 has a layered structure in which an elastic layer 22*b* is laid on an outer peripheral side of a metal core 22*a*, and a releasing layer (unillustrated) is laid on a surface of the elastic layer 22*b*. The metal core 22*a* is made of aluminum or the like, and has a diameter of about 20 mm, for example. It is preferable to adopt, as a material of the elastic layer 22*b*, an electrically insulating resin material (such as a silicone rubber) that has a thickness of about 8 mm. It is preferable to adopt, as a material of the releasing layer, an electrically insulating resin material (a fluorine-based resin such as a PFA (tetrafluoroethylene-perfluoroalkyl vinyl ether copolymer) resin) that has a thickness of about 10 μm to 50 μm, for example.

The fixing belt 21 is supported in the housing (unillustrated) of the fixing device 13 so as to be rotatable about a horizontal axis. The fixing belt 21 is formed in an endless cylindrical shape having an outer diameter of 20 mm to 50 mm, for example, and has approximately the same length as the pressure roller 22 with respect to the axial direction. The fixing belt 21 rotates clockwise in FIG. 2 along the insertion direction of the sheet S.

The fixing belt 21 has a layered structure in which, on an outer peripheral side of a heat generating layer as a base layer, an elastic layer and a releasing layer are laid. The heat generating layer is formed of, for example, a film of a metal such as nickel or the like having a thickness of 30 μm to 50 μm, for example, or a polyimide film blended with powder of a metal such as copper, silver, aluminum, or the like and having a thickness of 50 μm to 100 μm, for example. The elastic layer is formed of a silicone rubber or the like and has a thickness of 100 μm to 500 μm, for example. The releasing layer is formed of a fluorine-based resin such as a PFA resin or the like and has a thickness of about 30 μm to 50 μm, for example. The fixing belt 21 is in an ungrounded state.

The heating device 23 is what is called a SURF-heating type heating device, and includes the heat generator 24 and a heat-generator holding member 25. The heat generator 24 is an insulator formed of ceramic, which is an electrically insulating material. The heat generator 24 is arranged along the axial direction. The heat generator 24 is arranged opposite an inner peripheral surface of the fixing belt 21 with respect to the radial direction. With the pressure roller 22 in pressure contact with the fixing belt 21, the heat generator 24 and the inner peripheral surface of the fixing belt 21 are in contact with each other. With heat generated by the heat generator 24, an area around the contact portion (including the fixing nip portion N) of the fixing belt 21 with the heat generator 24 can be heated.

The heat-generator holding member 25 is an insulator formed of an electrically insulating material (for example, an LCP (liquid crystal polymer) resin (a liquid crystal polymer resin, a polyimide resin, a polyamide-imide resin, etc.). The heat-generator holding member 25 is arranged inward of the heat generator 24 with respect to the radial direction. The heat-generator holding member 25 holds the heat generator 24 such that at least an outer surface of the heat generator 24 in the radial direction is exposed. An outer peripheral surface of the heat-generator holding member 25 in the radial direction includes a curved surface portion 27 that is formed in an arch shape along the inner peripheral surface of the fixing belt 21, and an end surface portion 28 that is straight and continuous with the curved surface portion 27. The curved surface portion 27 is opposite the inner peripheral surface of the fixing belt 21 with respect to the radial direction.

The pressing member 26 is a rod-shaped metal body formed so as to be elongated along the axial direction. The pressing member 26 is arranged substantially at a center portion of the fixing belt 21 in the radial direction. The pressing member 26 is fixed to the end surface portion 28 of the heat-generator holding member 25. The pressing member 26 is connected to a main body frame (unillustrated) of the fixing device 13, and thereby the heat-generator holding member 25 is fixed to the main body frame.

The pressure roller 22 presses the heat generator 24 via the fixing belt 21, and then with a reaction force to the pressing force of the pressure roller 22, the pressing member 26 presses the heat generator 24 via the heat-generator holding member 25. The pressing member 26 is spaced from the fixing belt 21 by a predetermined distance. That is, the pressing member 26 is not in contact with the fixing belt 21, and also is electrically insulated from the fixing belt 21.

The belt guide 29 is located on a side opposite from the heat generator 24 with the pressing member 26 located therebetween. The belt guide 29 is in contact with the inner peripheral surface of the fixing belt 21 except the fixing nip portion N, and supports the fixing belt 21 from inside. The belt guide 29 is preferably an insulator formed of an electrically insulating material (for example, an LCP resin or the like) arranged to extend along the axial direction of the fixing belt 21 substantially to the same length as the fixing belt 21. Regarding the belt guide 29, a configuration may be adopted in which the belt guide 29 is fixed to the pressing member 26. In this case, the pressing member 26 and the belt guide 29 are electrically insulated from each other.

As described above, the fixing belt 21 is in the ungrounded state, and thus, charge is accumulated on the fixing belt 21 until an electrostatic capacitance of the fixing belt 21 is fulfilled. In this state, even if toner A on the surface of the sheet S to be inserted into the fixing nip portion N has been charged, toner A is not affected by such an electrostatic force as urges toner A to move to the outer peripheral surface of the fixing belt 21. This makes it unlikely for toner A on the sheet S to electrostatically adhere to the outer peripheral surface of the fixing belt 21. In this manner, without providing such a complicated configuration as provided in conventional charge applying devices, it is possible, with a simple configuration, to suppress electrostatic adhesion of toner A to the fixing belt 21. Thus, it is possible to provide the fixing device 13, which is capable of suppressing occurrence of the electrostatic offset phenomenon while suppressing increase of production cost, and the image forming apparatus 100 provided with the fixing device 13.

By forming the outer peripheral surface (the releasing layer) of the pressure roller 22, the heat generator 24, and the heat-generator holding member 25 each as an insulator, even if the metal core **22*a* of the pressure roller 22 is in a grounded state, it is possible to securely maintain the ungrounded state of the fixing belt 21. As described above, the pressing member 26 is spaced from the fixing belt 21 by the predetermined distance, and is electrically insulated from the fixing belt 21. Thus, even if the pressing member 26 is in the grounded state, it is possible to securely maintain the ungrounded state of the fixing belt 21. Preferably, the distance between the pressing member 26 and the fixing belt 21 is sufficient to make it unlikely for a discharge to occur from the fixing belt 21 toward the pressing member 26**.

By forming the belt guide 29 as an insulator, even if the belt guide 29 and the pressing member 26 are spaced from each other by a comparatively small distance or are in contact with each other, it is possible to securely maintain the ungrounded state of the fixing belt 21.

The fixing belt 21 can be charged by sliding on the pressure roller 22. Here, it is preferable to select a material for the releasing layer of the pressure roller 22 such that the fixing belt 21 and toner A on the surface of the sheet S can be charged to the same polarity. For example, in a case where toner A is positively charged, it is preferable to select one from materials on the plus side in what is called the triboelectric series such that the fixing belt 21 becomes positively charged by frictional electrification between the fixing belt 21 and the pressure roller 22.

The embodiment described above is in no way meant to limit the present disclosure, which thus allows for many modifications and variations within the spirit of the present disclosure. For example, the present disclosure is applicable not only to the tandem type color printer as illustrated in FIG. 1 but also to various image forming apparatuses using two-component developing method, such as digital or analog monochrome copiers, monochrome printers, color copiers, and facsimiles.

The heating device 23 adopted in the present disclosure is of the SURF-heating type as described above, but instead, the heating device 23 may be an IH heater provided with an induction heating unit including an exciting coil and a core.

It is also possible to adopt a roller fixing system in which a fixing roller (the first fixing member) is used instead of the fixing belt 21, the fixing roller having a layered structure similar to that of the pressure roller 22. In this case, instead of the above-described heating device 23, a heater such as a halogen lamp, a xenon lamp, or the like is provided inside a metal core of the fixing roller. The fixing roller in this case is in the ungrounded state.

Hereinafter, effects of the present disclosure will be described in more detail through examples.

EXAMPLES

Using the image forming apparatus 100 as shown in FIG. 1, a survey was conducted on presence/absence of occurrence of the offset phenomenon by making experiments with the fixing belt 21 in the grounded state and with the fixing belt 21 in the ungrounded state. The experiments were conducted with the fixing device 13 according to the present discloser and a fixing device 13 according to a comparative example incorporated in the image forming apparatus 100 as shown in FIG. 1. In the experiments, a monochrome halftone image was printed continuously on 500 sheets S under low-temperature, low-humidity conditions (10° C., 10% RH), and each time a predetermined number of sheets S were printed, the sheets S were checked for presence/absence of occurrence of the offset phenomenon.

In the fixing device 13 according to the present disclosure, as described above, the fixing belt 21 is in the ungrounded state. In contrast, in the fixing device 13 according to the comparative example, the fixing belt 21 is in the grounded state. The fixing device 13 according to the comparative example has a configuration in which, for example, the fixing belt 21 and the pressing member 26 are electrically connected to each other by means of another member that is electrically conductive, so that the fixing belt 21 is in the grounded state.

During the continuous printing, the sheets S were checked for presence/absence of occurrence of the offset phenomenon when the number of printed sheets reached 10, 50, 100, 200, and 500. The results are indicated in Table 1 below. In table 1, if the offset phenomenon was not observed, this was evaluated as "OK", if the offset phenomenon was observed, this was evaluated as "NG".

TABLE 1

| | Number of Continuously Printed Sheets (sheets) | | | | |
|---|---|---|---|---|---|
| | 10 | 50 | 100 | 200 | 500 |
| Comparative Example | OK | OK | OK | NG | NG |
| Present Disclosure | OK | OK | OK | OK | OK |

In the comparative example, when, during the continuous printing, the number of printed sheets reached 100, no offset phenomenon was observed on the sheets S. However, when the number reached 200, the offset phenomenon was observed on the sheets S. In contrast, in the present disclosure, even when the number of printed sheets in the continuous printing reached 500, no offset phenomenon was observed at all on the sheets S.

Accordingly, it has been confirmed that the present disclosure, in which the fixing belt 21 is in the ungrounded state, is capable of suppressing occurrence of the offset phenomenon.

The present disclosure is applicable to image forming apparatuses provided with a fixing device that passes a recording medium through a fixing nip portion formed by a first fixing member and a second fixing member while applying heat and pressure to a toner image formed on the recording medium to thereby fuse and fix the toner image on the recording medium. By using the present disclosure, it is possible to provide an image forming apparatus capable of suppressing occurrence of image failure while suppressing increase of production cost.

What is claimed is:

1. A fixing device, comprising:

a first fixing member that is in an ungrounded state and comes into contact with a toner image on a sheet;

a second fixing member arranged opposite the first fixing member;

a pressing member that presses the first fixing member against the second fixing member so as to form, at a contact portion between the first fixing member and the second fixing member, a nip portion through which the sheet passes; and a heating device that heats the first fixing member, wherein the first fixing member is a fixing belt that is in contact with an outer peripheral surface of the second fixing member;

the heating device includes a heat generator that is provided inside the fixing belt in a radial direction of the fixing belt and heats such a part of the fixing belt that overlaps with the nip portion, and a heat-generator holding member that holds the heat generator;

the pressing member is provided inward of the heat-generator holding member with respect to the radial direction of the fixing belt and presses the heat generator toward the nip portion via the heat-generator holding member;

the heat generator, the heat-generator holding member, and the outer peripheral surface of the second fixing member are each an insulator formed of an electrically insulating material; and the pressing member is spaced from an inner peripheral surface of the fixing belt by a predetermined distance, and the fixing belt and the pressing member are electrically insulated from each other.

2. The fixing device according to claim 1, further comprising:

a belt holding member that is arranged inside of the fixing belt in the radial direction of the fixing belt, wherein the belt holding member is an insulator formed of an electrically insulating material.

3. The fixing device according to claim 1, wherein an outer peripheral surface of the first fixing member slides on an outer peripheral surface of the second fixing member so as to be charged to a same polarity as toner on the sheet that passes through the nip portion.

4. An image forming apparatus, comprising:

an image forming portion that forms a toner image on the sheet; and the fixing device according to claim 1 that fixes, on the sheet, the toner image that has been formed on the sheet at the image forming portion and has not been fixed yet.

* * * * *